United States Patent
Ren (10) Patent No.: US 7,035,737 B2
(45) Date of Patent: Apr. 25, 2006

(54) METHOD FOR SEISMIC WAVEFIELD EXTRAPOLATION

(75) Inventor: Jiaxiang Ren, Katy, TX (US)

(73) Assignee: PGS Americas, Inc., Houston, TX (US)

( * ) Notice: Subject to any disclaimer, the term of this patent is extended or adjusted under 35 U.S.C. 154(b) by 180 days.

(21) Appl. No.: 10/860,944

(22) Filed: Jun. 4, 2004

(65) Prior Publication Data

US 2005/0273265 A1  Dec. 8, 2005

(51) Int. Cl.
*G01V 1/28* (2006.01)
(52) U.S. Cl. ........................................... 702/17
(58) Field of Classification Search .................. 702/14, 702/17, 18
See application file for complete search history.

(56) References Cited

U.S. PATENT DOCUMENTS

| | | | | |
|---|---|---|---|---|
| 5,349,527 A | * | 9/1994 | Pieprzak et al. | 702/17 |
| 6,295,505 B1 | * | 9/2001 | Assa et al. | 702/17 |
| 6,519,532 B1 | * | 2/2003 | Meng | 702/17 |
| 6,687,617 B1 | * | 2/2004 | Kelly | 702/14 |

OTHER PUBLICATIONS

O. Holberg, "Toward optimum one-way wave propagation", Geophysical Prospecting, 1988, pp. 99-114, vol. 36.

G. Blacquiere, H.W.J. Debeye, C.P.A. Wapenaar, A.J. Berkhout, "3D Table-Driven Migration", Geophysical Prospecting, 1989, pp. 925-958, vol. 37.

Dave Hale, "3-D depth migration via McClellan transformations", Geophysics, Nov. 1991, pp. 1778-1785, vol. 56, No. 11.

Robert Soubaras, Explicit 3-D Migration Using Equiripple Polynomial Expansion and Laplacian Synthesis, 62$^{nd}$ Annual International Meeting, SEG, Exp. Abstracts, 1992, pp. 905-908.

A. Sollid, B. Arntsen, "Cost-effective 3D one-pass depth migration", Geophysical Prospecting, 1994, pp. 755-776, vol. 42.

Biondo Biondi, Gopal Palacharla, "3D depth migration by rotated McClellan filters", Geophysical Prospecting, 1995, pp. 1005-1020, vol. 43.

Rune Mittet, "Explicit 3D depth migration with a constrained operator", 72$^{nd}$ SEG Annual Meeting, SEG Exp. Abstracts, 2002, pp. 1148-1151.

* cited by examiner

*Primary Examiner*—Donald McElheny, Jr.
(74) *Attorney, Agent, or Firm*—E. Eugene Thigpen; Charles R. Schweppe (57) ABSTRACT

A seismic wavefield is extrapolated using variable extrapolation step size and then phase-shifted linear interpolation is applied to the extrapolated wavefield.

11 Claims, 4 Drawing Sheets

METHOD FOR SEISMIC WAVEFIELD EXTRAPOLATION

CROSS-REFERENCES TO RELATED APPLICATIONS

Not Applicable

FEDERALLY SPONSOR RESEARCH OR DEVELOPMENT

Not Applicable

SEQUENCE LISTING, TABLE, OR COMPUTER LISTING

Not Applicable

BACKGROUND OF THE INVENTION

1. Field of the Invention

Equation Chapter 1 Section 1

This invention relates generally to the field of geophysical prospecting. More particularly, the invention relates to the field of seismic data processing. Specifically, the invention is a method for seismic wavefield extrapolation using variable extrapolation step size and phase-shifted linear interpolation.

2. Description of the Related Art

The use of three-dimensional (3D) seismic methods has resulted in increased drilling success in the oil and gas industry. However, 3D seismic methods are computationally expensive. A crucial point in processing 3D seismic data is the migration step, both because of its 3D nature and the computational cost involved. Seismic migration is the process of constructing the reflector surfaces defining the subterranean earth layers of interest from the recorded seismic data. Thus, the process of migration provides an image of the earth in depth or time. It is intended to account for both positioning (kinematic) and amplitude (dynamic) effects associated with the transmission and reflection of seismic energy from seismic sources to seismic receivers. Although vertical variations in velocity are the most common, lateral variations are also encountered. These velocity variations arise from several causes, including differential compaction of the earth layers, uplift on the flanks of salt diapers, and variation in depositional dynamics between proximal (shaly) and distal (sandy to carbonaceous) shelf locations.

Seismic depth migration has traditionally been performed through the application of Kirchhoff methods. However, because of recent advances in computing hardware and improvements in the design of efficient extrapolators, methods that are based on solutions of the one-way wave equation are becoming increasingly popular. Downward wave extrapolation results in a wavefield that is an approximation to the one that would have been recorded if both sources and receivers had been located at a depth z. Downward extrapolation of the seismic wavefield is a key element of wave equation based migrations because it determines the image quality and computational cost. Extrapolation by finite difference methods is utilized for its ability to handle lateral velocity variations. It can be classified into explicit and implicit methods.

A number of the algorithms used in two-dimensional (2D) depth migration have not been successful in the 3D case. For example, implicit finite-difference extrapolation methods have the advantage of being unconditionally stable, but the disadvantage of being difficult to extend to the 3D case. The most common 3D implicit method is based on the operator splitting into alternating direction components. The splitting errors that these methods exhibit in the 3D case are translated into non-circularly symmetric impulse responses, which become unacceptable for dips higher than 45°. The splitting methods have errors that depend significantly on reflector dip and azimuth and thus have problems with reflector positioning errors. Similarly, two-pass methods have problems handling lateral velocity variations. In contrast, explicit extrapolation methods that approximate the extrapolation operator as a finite-length spatial filter are easily extended to the 3D case. The difficulty with explicit extrapolation is that the stability condition is not automatically fulfilled. The stability condition is that no amplitude at any frequency will grow exponentially with depth. Stability must be guaranteed by careful design of the extrapolation operators.

Three-dimensional seismic wavefields may be extrapolated in depth, one frequency at a time, by two-dimensional convolution with a circularly symmetric, frequency- and velocity-dependent operator. This depth extrapolation, performed for each frequency independently, lies at the heart of 3D finite difference depth migration. The computational efficiency of 3D depth migration depends directly on the efficiency of this depth extrapolation. For these techniques to yield reliable and interpretable results, the underlying wavefield extrapolation must propagate the waves through inhomogeneous media with a minimum of numerically induced distortion over a range of frequencies and angles of propagation.

Holberg, 0., "Towards optimum one-way wave propagation", *Geophysical Prospecting*, Vol. 36, 1988, pp. 99–114, discloses the first explicit depth extrapolation with optimized operators. Holberg (1988) proposes a technique, solely for 2D depth migration, by generalizing conventional finite-difference expressions in the frequency-space domain. This technique yields optimized spatial symmetric convolutional operators, whose coefficients can be pre-computed before migration and made accessible in tables. The ratio between the temporal frequency and the local velocity is used to determine the correct operator at each grid point during the downward continuation, by fitting their spatial frequency response to the desired phase shift response over a range of frequencies and angles of propagation to control numerical distortion. The Holberg (1988) technique can be made to handle lateral velocity variations, but only applies to 2D migration.

Blacquiere, G., Debeye, H. W. J, Wapenaar, C. P. A., and Berkhout, A. J, "3-D table driven migration", *Geophysical Prospecting*, Vol. 37, 1989, pp. 925–958, extends the method disclosed in Holberg (1988) to 3D migration. The wavefield extrapolation is performed in the space-frequency domain as a space-dependent spatial convolution with recursive Kirchhoff extrapolation operators based on phase shift operators. The optimized operators are pre-calculated and stored in a table for a range of wavenumbers. The extrapolation is performed recursively in the space domain, so both vertical and lateral velocity variations can be handled. The Blacquiere et al. (1989) method is accurate, but is a full 3D method and hence computationally expensive.

Hale, D., "3-D depth migration via McClellan transformations", *Geophysics*, Vol. 56, No. 11 (November, 1991), pp. 1778–1785, introduces a more efficient 3D scheme based on the McClellan transform, which gives numerically isotropic extrapolation operators. This is commonly referred to as the Hale-McClellan scheme. Given the coefficients of one-dimensional frequency- and velocity-dependent filters similar to those used to accomplish 2D depth migration, McClellan transformations lead to an algorithm for 3D depth migration. Because the coefficients of two-dimensional depth extrapolation filters are never explicitly computed or stored, only the coefficients of the corresponding one-dimensional filters are required, leading to a computationally more efficient scheme. However, the Hale (1991) method has numerical anisotropy.

Soubaras, R, "Explicit 3-D migration using equiripple polynomial expansion and Laplacian synthesis", 62$^{nd}$ Ann., Internat. Mtg., Soc. Expl. Geophys., Expanded Abstracts, 1992, pp. 905–908, improves the Hale-McClellan scheme. Soubaras (1992) uses an expansion in second-order differential operators instead of the McClellan transform. The Soubaras method also uses the Remez algorithm to design the coefficients for both the extrapolation operator and for the differential operators. This method avoids the numerical anisotropy to a large degree and is comparable in computational cost to the Hale-McClellan scheme. The Soubaras approach takes advantage of operator circular symmetry, as do the McClellan transformations, but avoids the computation of a 2D filter approximating the cosine of the wavenumbers. The approach defines a Laplacian operator, approximates the Laplacian by the sum of two 1D filters approximating the second derivatives, and approximates the exact extrapolation operator by a polynomial. The second derivative operators and the polynomial expansion are both calculated by the Remez exchange algorithm.

Sollid, A., and Arntsen, B., "Cost effective 3D one-pass depth migration", *Geophysical Prospecting*, Vol. 42, 1994, pp. 755–716, makes the Soubaras (1992) scheme more cost effective. Sollid and Arntsen (1994) used frequency adaptive optimized derivative operators. The expansion in second order differential operators is used, but the expansion coefficients and differential operators are designed using a least squares approach rather than the Remez algorithm. A set of variable length second order differential operators for each wavenumber has different spectra and lengths to ensure that the resulting wave extrapolation is both accurate and efficient.

Biondi, B., and Palacharla, G., 1995, 3D depth migration by rotated McClellan filter: *Geophysical Prospecting*, 43, 1005–1020, improves the accuracy of the Hale-McClellan scheme. Biondi and Paracharla (1995) rotate the 9-point McClellan filter by 45° and then average the rotated filter with either of the original 9-point or 17-point McClellan filters. The averaged filter images steep dips without dispersion of the wavefield and without much additional computational cost.

Mittet, R., 2002, "Explicit 3D depth migration with a constrained operator", 72nd Ann. Internat. Mtg., Soc. Expl. Geophys., Expanded Abstracts, pp. 1148–1151, discloses a constrained explicit operator method which is a modification of Blacquiere et al. (1989) to make the scheme more computationally efficient. The number of independent operator coefficients is constrained to reduce the number of computer floating point operations required, thus increasing computer efficiency. The innermost coefficients in the core area of the extrapolation operator are computed in a standard fashion. The remaining outermost coefficients in the operator, related to very high dip and evanescent wave propagation, change only as a function of radius and are constant within radial intervals.

All of the methods discussed above are, however, still computationally expensive. Thus, a need exists for an explicit depth extrapolation method for 3D seismic migration that is more computationally efficient.

BRIEF SUMMARY OF THE INVENTION

The invention is a method of seismic wavefield extrapolation in 3D explicit finite difference migration. A wavefield is extrapolated using variable extrapolation step size. Then, phase-shifted linear interpolation is applied to the extrapolated wavefield.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for seismic wavefield extrapolation for use in 3D explicit finite difference depth migration. In one embodiment, the invention utilizes variable extrapolation step size during each extrapolation step of the depth migration. The variable extrapolation step size is determined dynamically by requiring the wavenumber of the wave component being migrated to satisfy the aliasing condition. The invention utilizes variable extrapolation step size in order to maximize the extrapolation interval during each extrapolation step and thus reduce the total number of extrapolation steps required, thereby reducing the overall computational cost of depth migration.

In another embodiment, the invention utilizes phase-shifted linear interpolation. Use of variable extrapolation step size in depth migration results in the extrapolated wavefield being output at irregular depths. Most additional processing software requires regular depth grids for input.

The method of the invention applies a phase-shifted linear interpolation to interpolate the extrapolated wavefield after each extrapolation step onto a regular depth grid. The phase-shifted linear interpolation of the invention is suitable for 3D explicit finite difference depth migration and is more accurate than conventional linear interpolation usually utilized in implicit finite difference migration.

In another embodiment, the invention utilizes explicit constrained finite-difference operators. Downward extrapolation of a seismic wavefield is the key element of wave equation based migration because the extrapolation step determines the image quality and computational cost. Explicit extrapolation for 3D depth migration, even with symmetrical operators as in Blacquiere et al., (1989), may still be expensive due to a full 2D convolution being performed at each depth. The scheme based on the McClellan transform proposed by Hale (1991) is much more efficient but introduces numerical anisotropy at the same time. Among the alternatives discussed above—Soubaras (1992); Sollid and Arntsen (1994); Biondi and Palacharla (1995); and Mittet (2002)—the constrained operator proposed by Mittet is the most attractive. The invention utilizes Mittet's constrained operator to overcome the numerical anisotropy problem and to keep the computational cost low, comparable to the Hale-McClellan scheme. Use of Mittet's constrained operator benefits migration cost and image quality by providing a reduced number of independent coefficients. The use also provides flexibility that allows for different propagation angles and step sizes in the in-line and cross-line directions.

In another embodiment the invention utilizes variable operator lengths for the extrapolation operators. The variable extrapolation operator length is determined dynamically by the wavenumber of the wave component being migrated. The invention utilizes dynamically variable operator lengths in order to minimize the size of the extrapolation operator and thus reduce the computational cost for extrapolation, thereby further reducing the overall computational cost of depth migration.

To illustrate the method of the invention, seismic wavefield extrapolation for use in 3D explicit finite difference depth migration is described. Downward wavefield extrapolation transforms a seismic wavefield $P(\omega, x, y, z)$ at lateral location x, y and depth level z to the seismic wavefield $P(\omega, x, y, z+\Delta z)$ at depth level $z+\Delta z$ by convolving $P(\omega, x, y, z)$ with an extrapolation operator $w(k_\omega(x, y), x, y, \Delta z)$. The seismic wavefield $P(\omega, x, y, z)$ is in the space-frequency domain, having been transformed from the space-time domain, if necessary, by a temporal Fourier transform. Here, x and y are the horizontal spatial coordinates, typically in the in-line and cross-line directions, respectively, of the seismic survey that collected the data. The spatial interval $\Delta z$ is an extrapolation step size in the vertical z-coordinate direction, where depth z is measured positive downwards. The transformation in explicit depth extrapolation can be expressed in the space-frequency domain by a two-dimensional spatial convolution along the horizontal x- and y-directions, as given by:

$$P(\omega, x, y, z + \Delta z) = w(k_\omega, x, y, \Delta z) * P(\omega, x, y, z) \qquad (1)$$
$$= \int\int w(k_\omega, x', y', \Delta z) P(\omega, x - x', y - y', z) dx' dy'.$$

The extrapolation given in Equation (1) is applied recursively downward through all extrapolation step sizes $\Delta z$ to reach all depth levels z of interest. The local wavenumber $k_\omega(x, z)$ is defined by:

$$k_\omega(x, y) = \frac{\omega}{V(x, y)}, \qquad (2)$$

where $\omega = 2\pi f$ is the angular frequency for frequency f and $V=V(x, y)$ is the local propagation velocity of the medium at the lateral location (x, y).

A discrete version of Equation (1) is needed for computer implementation. Let i, j, l, and m be integers and let $\Delta x$ and $\Delta y$ be step sizes (grid intervals) in the x- and y-directions, respectively. Then, lateral locations can be defined discretely by $x_i = i \cdot \Delta x$ and $y_j = j \cdot \Delta y$. Discrete downward extrapolation transforms a discrete representation of the wavefield $P(\omega, x_i, y_j, z)$ at lateral location $x_i, y_j$ and depth level z to the wavefield $P(\omega, x_i, y_j, z+\Delta z)$ at depth level $z+\Delta z$, by convolving with a discrete extrapolation operator $w(k_\omega(x_i, y_j), x_i, y_j, \Delta z)$. Thus, as in the second equality in Equation (1), a discrete version of explicit depth extrapolation can be expressed by:

$$P(\omega, x_i, y_j, z + \Delta z) = \qquad (3)$$
$$\sum_{l=-L}^{L} \sum_{m=-M}^{M} w(k_\omega(x_i, y_j), x_l, y_m, \Delta z) P(\omega, x_i - x_l, y_j - y_m, z),$$

where L and M are called the half-lengths of the operator w in the x- and y-directions, respectively. The discrete wavenumber $k_\omega(x_i, y_j)$ is given by replacing Equation (2) by the following discrete version:

$$k_\omega(x_i, y_j) = \frac{\omega}{V(x_i, y_j)} \qquad (4)$$

The integers L and M in Equation (3) are called operator half-lengths since the number of coefficients in the extrapolation operator w is $(2L+1) \cdot (2M+1)$. In one embodiment of the invention, the operator half-length, M, in the y-direction (cross-line) is determined from the operator half-length, L, in the x-direction (in-line) using the relationship:

$$M = \frac{\Delta x}{\Delta y} L \qquad (5)$$

If $\Delta y$ is greater than $\Delta x$, as is typically the case for marine seismic acquisition, the total number of coefficients in the extrapolation operator, and thus the computational cost, is reduced through the application of Equation (5).

The operator half-lengths, L and M, in Equation (3) determine the operator length, or size, of the explicit extrapolation operator w, and thus the efficiency of the extrapolation method. In principle, the operator half-lengths would be infinite for exactness. In practice, these operator half-lengths must be finite for computer implementation. In particular, these operator half-lengths should be minimized for increased computer efficiency. In another embodiment of the invention, the operator half-lengths can be made to depend optimally on the wavenumber, $k_\omega(x_i, y_j)$.

In one embodiment of the invention, the coefficients of the extrapolation operator w are designed to approximate the inverse spatial Fourier transform of the exact extrapolation operator E for explicit depth extrapolation. The exact extrapolation operator E is given in the frequency-wavenumber domain by the phase shift operator:

$$E(k_\omega, k_x, k_y, \Delta z) = \exp(i\sqrt{k_\omega^2 - k_x^2 - k_y^2}\Delta z), \quad (6)$$

where $k_x$ and $k_y$ are the spatial wavenumber components in the x- and y-directions.

The design strategy is to optimize the discrete operator $w(k_{\omega,x^l}, y_m, \Delta z) = w(\omega/V, l\Delta x, m\Delta y, \Delta z)$ such that its wavenumber-domain response $W(k_\omega, k_x, k_y, \Delta z)$ approximates the exact extrapolation operator $E(k_\omega, k_x, k_y, \Delta z)$ given by Equation (6) closely. The difference between the operators $E(k_\omega, k_x, k_y, \Delta z)$ and $W(k_\omega, k_x, k_y, \Delta z)$ should be a minimum for a given frequency c and velocity V(x, y), that is, for a given wavenumber $k_\omega(x, y)$. The difference between the operators $E(k_\omega, k_x, k_y, \Delta z)$ and $W(k_\omega, k_x, k_y, \Delta z)$ is minimized in some appropriate norm, represented by $\| \|$, in the frequency-wavenumber domain:

$$\|E(k_\omega, k_x, k_y, \Delta z) - W(k_\omega, k_x, k_y, \Delta z)\| = \text{minimum}, \quad (7)$$

over an appropriate range of wavenumbers.

In one embodiment of the invention, the optimization is performed on the operator's real and imaginary parts using an $L^8$ norm for all wavenumbers $k_x$ and $k_y$ up to the critical wavenumber $k_r^c = (k_x^c, k_y^c)$ determined by $$\frac{(k_x^c)^2}{k_\omega^2 \sin^2(\theta_x^{max})} + \frac{(k_y^c)^2}{k_\omega^2 \sin^2(\theta_y^{max})} = 1, \quad (8)$$

where $\theta_x^{max}$ and $\theta_y^{max}$ are the maximum propagation angles considered in the x- and y-directions, respectively. The angles $\theta_x^{max}$ and $\theta_{hu\,max}$ can also be viewed as the maximum dip angles selected to be accurately migrated in the x- and y-directions, respectively.

Figure 1:
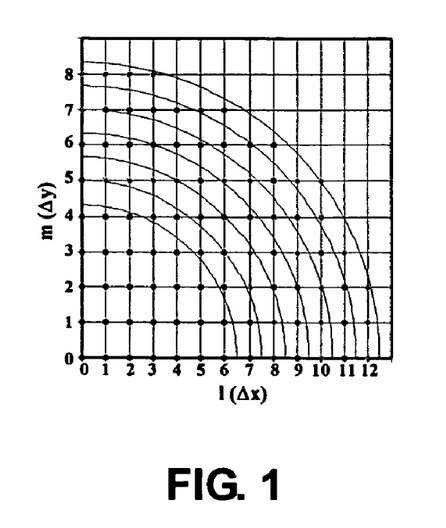
FIG. 1 is a plan view of the coefficient layout of a constrained operator.

In one embodiment of the invention, the explicit extrapolation operator utilized is the constrained operator described in Mittet (2002), discussed above. Being a function of the local wavenumber $k_\omega$, Mittet's constrained operator is able to handle lateral velocity variations. The constrained operator assumes a circular symmetry, but divides the operator coefficients into core and constrained areas. In the core area the coefficient layout is the same as that for a full operator. In the constrained area the coefficients in a ring with radii $(l-1/2)\Delta x \leq r < (l+1/2)\Delta x$ are assigned an identical value. FIG. 1 is a plan view of the coefficient layout of a constrained operator. FIG. 1 shows a constrained operator with the $\Delta y/\Delta x$ ratio of 1.5, x-direction half-length of 12, y-direction half-length of 8, and core half-length of 6.

Using the constrained operator reduces the number of independent operator coefficients. By factorizing out the coefficients in a ring during the convolution, the number of complex multiplications is reduced. Because complex multiplication is expensive, using the constrained operator improves the extrapolation efficiency, that is, reduces the cost.

In one embodiment of the invention, the constrained operator is deigned for a sufficient set of wavenumbers $k_\omega$, which are then utilized to form an operator table. For a given accuracy, the operator length required varies with $k_\omega$. In another embodiment of the invention, the extrapolation process selects the shortest operator that satisfies the accuracy required based on the wavenumber value of the wave component being migrated. This measure avoids using unnecessarily long operators and can reduce computational cost.

A standard procedure in the art is to set the operator half-lengths L and M to a constant for all wavenumbers $k_\omega$. It is well known in the art that when the maximum design propagation angle is increased, the operator half-lengths must also be increased, if the numerical accuracy is to be kept fixed. However, for a given maximum propagation angle and a fixed numerical accuracy, the required operator half-lengths vary with the wavenumber $k_\omega$. The dependency is such that the operator half-lengths must be increased with increased $k_\omega$. Thus, the numerical workload of depth extrapolation can be significantly reduced by constructing operator tables with variable operator half-lengths.

Operator tables with variable operator half-lengths may be obtained in several ways. In one embodiment of the invention, the operator tables are obtained directly in the operator optimization software. For each wavenumber $k_\omega$, the strategy is to start with too low a value of the half-lengths L and M. Then the value of each half-length is increased with a step until proper convergence is achieved. Use of operator tables with variable operator half-lengths are discussed, for example, in U.S. patent application Ser. No. 10/668,909, by Mittet, Rene, "Method for Seismic Migration using Explicit Depth Extrapolation Operators with Dynamically Variable Operator Length", filed Sep. 22, 2003, and assigned to the assignee of the present application.

Wavenumber intervals covered by each operator half-length would typically vary, depending on such factors as operator type, maximum dip angles, and accuracy conditions. However, a general trend is that an operator with a short half-length can be used for wavenumber values up to 70 to 80 percent of the Nyquist wavenumber. Variable length operator tables require a determination of local wavenumber during the wavefield extrapolation. The simplest procedure is to determine the local velocity at the lateral location $(x_i, y_j)$ at each depth level. Explicit depth extrapolation is performed for one ω value at a time. For a given depth level z, when the angular frequency ω and the local propagation velocity $V(x_i, y_j)$ are known, the local wavenumber is given by Equation (4). Thus, the required extrapolation operator half-lengths L and M are known at the location at this depth step $\Delta z$. Here, the source of the gain in computer efficiency is apparent. First, for small and intermediate values of frequency ω, high numerical accuracy can be retained with an extrapolation operator with short half-lengths L and M. Second, in high velocity zones, as, for example, in salt, the wavenumber $k_\omega(x_i,y_j)$ will be small due to the high value for the propagation velocity $V(x_i,y_j)$. Again, high accuracy and high dip wave extrapolation can be performed with relatively short extrapolation operator half-lengths.

In yet another embodiment of the invention, a variable extrapolation step size $\Delta z$ is utilized to reduce the number of extrapolations. The variable step size $\Delta z$ is determined dynamically by the wavenumber value. Assume that the extrapolation interval is $\Delta z$. The wavefield at depth $z+\Delta z$ can be obtained by downward extrapolating the wavefield at depth z. In the frequency-wavenumber domain, the extrapolation is ideally expressed by a phase shift:

$$P(\omega, k_x, k_y, z+\Delta z) = P(\omega, k_x, k_y, z)\exp(ik_z\Delta z). \quad (9)$$

where $k_z$ is the spatial wavenumber component in the z-direction.

According to the aliasing condition, the phase shift in the interval $\Delta z$ should be no more than $\pi$ radians. The phase shift is contained in the exponential term in Equation (9), so:

$$k_z \Delta z \leq \pi. \tag{10}$$

Figure 2:
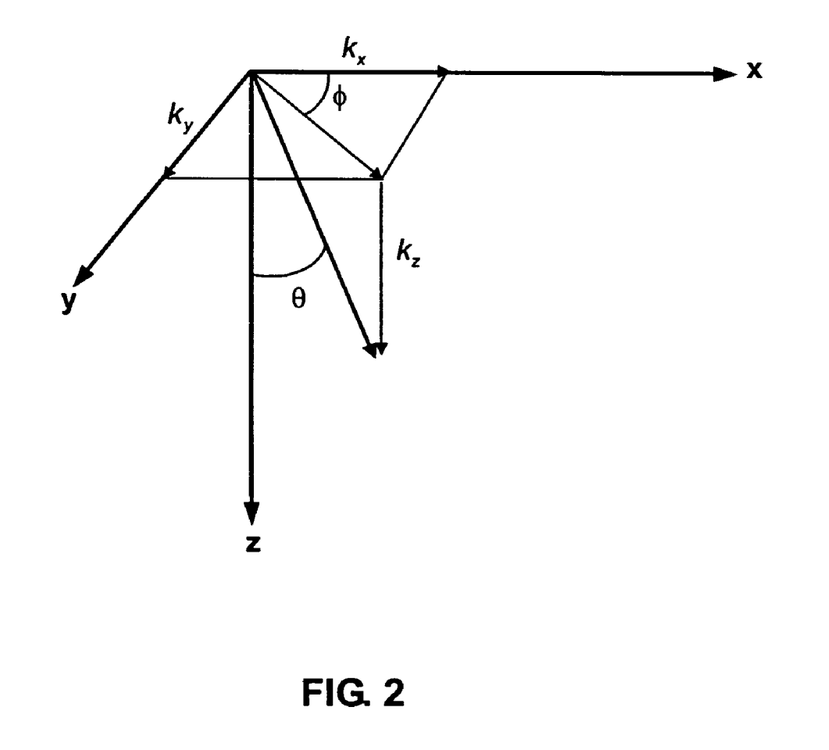
FIG. 2 is a schematic illustration of the geometric layout of wave propagation.

The vertical wavenumber $k_z$ can be expressed as:

$$k_z = \frac{\omega}{V}\sqrt{1 - \left(\frac{V}{\omega}\right)^2(k_x^2 + k_y^2)} = \frac{\omega}{V}\sqrt{1 - \sin^2\theta} = \frac{\omega}{V}\cos\theta, \tag{11}$$

where V is the velocity in the interval $[z, z+\Delta z]$, and $\theta$ is the angle between the wave propagation and vertical directions, as shown in FIG. 2. FIG. 2 is a schematic illustration of the geometric layout of wave propagation.

From equations (10) and (11), there results:

$$\Delta z \leq \frac{\pi V}{\omega \cos\theta} = \frac{V}{2f\cos\theta}, \tag{12}$$

where f is the frequency corresponding to the angular frequency $\omega$. The minimum $\Delta z$ happens when $\theta=0$. Therefore, in one embodiment of the invention, equation (12) is simplified to:

$$\Delta z \leq \frac{1}{2}\frac{V}{f}. \tag{13}$$

In another embodiment of the invention, a general criterion for selecting the extrapolation interval is expressed as, $$\Delta z = \frac{1}{2C}\frac{V}{f}. \tag{14}$$

In equation (14), C is a constant, with $C \geq 1$. In yet another embodiment of the invention, C=1.25.

Equation (13) or (14) allows the use of a variable extrapolation step size. For lower frequency components, larger extrapolation intervals can be applied, resulting in a reduced number of extrapolation steps. In addition, for a given frequency component, the extrapolation interval can be changed with depth based on the velocity variation. If a constant step size is applied, it needs to be decided by the maximum frequency and minimum velocity, and thus must be very small in general. Therefore, the extrapolation of the variable extrapolation step size could reduce the computation cost substantially.

The velocity in the interval $[z, z+\Delta z]$ is generally not a constant, but varies with the lateral location (x, y). To make Equations (13) and (14) handle this case, the velocity V is replaced with $V_{min}$, that is, the minimum velocity at depth z.

The resultant equations are:

$$\Delta z \leq \frac{1}{2}\frac{V_{min}}{f}. \tag{15}$$

and $$\Delta z = \frac{1}{2C}\frac{V_{min}}{f}. \tag{16}$$

However, use of a variable step size yields an extrapolated wavefield that is output at an irregular depth grid. Thus, the extrapolated wavefield has to be interpolated onto a regular depth grid for output. Thus, in another embodiment of the invention, an interpolation method, called phase-shifted linear interpolation, is utilized. The phase-shifted linear interpolation is utilized to interpolate the extrapolated wavefield onto a regular output depth grid.

The vertical wavenumber $k_z$ in the exponential term in Equation (9) can be viewed as two exponential contributions, as can be seen from Equation (11). The first exponential corresponds to the "zero-offset" term and is often referred to as the thin-lens contribution. The second exponential corresponds to the "moveout" term and is often called the diffraction contribution. The linear interpolation typically used in implicit finite difference migrations is performed only on the diffraction term, while the thin-lens term that is hard to interpolate is calculated exactly. In an explicit finite difference migration, the diffraction and thin-lens terms are not separated and thus the use of linear interpolation on the thin-lens term would generate a large error.

The phase-shifted linear interpolation of the invention is described as follows. Assume that the interpolation interval is $\delta z$ and $\Delta z = N\delta z$. Given the extrapolated wavefields $P(\omega, x, y, z)$ and $P(\omega, x, y, z+\Delta z)$ at the top, z, and bottom, $z+\Delta z$, of an extrapolation interval, the wavefield at an intermediate point, $z+n\delta z$, obtained by the phase-shifted linear interpolation can be expressed as $$P(\omega, x, y, z+n\delta z) = \frac{N-n}{N}\exp\left[i\frac{\omega}{V(x,y)}n\delta z\right]P(\omega, x, y, z) + \frac{n}{N}\exp\left[-i\frac{\omega}{V(x,y)}(N-n)\delta z\right]P(\omega, x, y, z+\Delta z). \tag{17}$$

The phase shift prior to the linear interpolation eliminates the influence of the thin-lens term. The phase-shifted linear interpolation differs from conventional linear interpolation in that a phase shift $\exp[i\omega n\delta z/V]$ is applied to the top wavefield and a phase shift $\exp[-i\omega(N-n)\delta z/V]$ is applied to the bottom wavefield before the linear interpolation is applied to the phase-shifted wavefields.

For comparison to conventional linear interpolation, the error in the phase-shifted linear interpolation is quantified. To isolate the interpolation error, we assume that the wavefield extrapolation process is ideal, which is described by Equation (9). The exact wavefield at the point $z+n\delta z$ has the following form:

$$P(\omega, k_x, k_y, z+n\delta z) = \tag{18}$$

-continued $$P(\omega, k_x, k_y, z)\exp\left[i\frac{\omega n\delta z}{V}\sqrt{1-\left(\frac{V}{\omega}\right)^2(k_x^2+k_y^2)}\right]$$

In the frequency-wavenumber domain, the expression for the wavefield at depth $z+n\delta z$ given by the phase-shifted linear interpolation of the wavefields at depths z and $z+N\delta z$ is $$P_{psi}(\omega, k_x, k_y, z+n\delta z) = P(\omega, k_x, k_y, z)\exp\left(i\frac{\omega n\delta z}{V}\right) \quad (19)$$
$$\left\{\frac{N-n}{N}+\frac{n}{N}\exp\left[i\frac{\omega N\delta z}{V}\left(\sqrt{1-\left(\frac{V}{\omega}\right)^2(k_x^2+k_y^2)}-1\right)\right]\right\}.$$

The relative error of the phase-shifted linear interpolation, $$e_{psi} = \frac{|P(\omega, k_x, k_y, z+n\delta z) - P_{psi}(\omega, k_x, k_y, z+n\delta z)|}{|P(\omega, k_x, k_y, z+n\delta z)|}, \quad (20)$$

can be shown to have the following expression:

$$e_{psi}(f/V, \Delta z, \theta, n/N) \approx \frac{\pi^2}{2}\frac{n}{N}\left(1-\frac{n}{N}\right)\left(\frac{f}{V}\right)^2(\Delta z)^2 \sin^4\theta \quad (21)$$

The phase-shifted linear interpolation honors the inputs, with a zero error at the top (n=0) and bottom (n=N). The maximum error happens at the middle of the extrapolation interval (n=N/2), which is given by:

$$e_{psi}^{\max}(f/V, \Delta z, \theta) \approx \frac{\pi^2}{8}\left(\frac{f}{V}\right)^2(\Delta z)^2 \sin^4\theta. \quad (22)$$

With an extrapolation interval $\Delta z=20$ m, frequency f=30 Hz, and velocity V=2500 m/s, the maximum interpolation errors are 0, 0.4%, and 4% for the propagation angles $\theta=0°$, 30°, and 60°, respectively. These errors are quite small.

For the variable extrapolation step size, inserting the aliasing condition in Equation (14) into Equation (22) yields $$e_{psi}^{\max}(\theta) \approx \frac{\pi^2}{32C^2}\sin^4\theta. \quad (23)$$

With C=1.25, the interpolation errors are 0, 1%, and 11% for the propagation angles $\theta=0°$, 30°, and 60°, respectively. Again, these errors are quite small.

Linear interpolation is the method most widely used in the industry. Applying linear interpolation between the wavefields at depths z and $z+N\delta z$ gives $$P_l(\omega, k_x, k_y, z+n\delta z) = \quad (24)$$

-continued $$P(\omega, k_x, k_y, z)\left\{\frac{N-n}{N}+\frac{n}{N}\exp\left[i\frac{\omega N\delta z}{V}\sqrt{1-\left(\frac{V}{\omega}\right)^2(k_x^2+k_y^2)}\right]\right\}.$$

The relative error of the linear interpolation, $$e_l = \frac{|P(\omega, k_x, k_y, z+n\delta z) - P_l(\omega, k_x, k_y, z+n\delta z)|}{|P(\omega, k_x, k_y, z+n\delta z)|}, \quad (25)$$

has the following expression:

$$e_l(f/V, \Delta z, \theta, n/N) \approx 2\pi^2\frac{n}{N}\left(1-\frac{n}{N}\right)\left(\frac{f}{V}\right)^2(\Delta z)^2\cos^2\theta. \quad (26)$$

Linear interpolation honors the inputs, with a zero error at the top (n=0) and bottom (n=N). The maximum error happens at the middle of the extrapolation interval (n=N/2), which is given by:

$$e_l^{\max}(f/V, \Delta z, \theta) \approx \frac{\pi^2}{2}\left(\frac{f}{V}\right)^2(\Delta z)^2\cos^2\theta. \quad (27)$$

The error of the linear interpolation could be very large. With an extrapolation interval $\Delta z=20$ m, frequency f=30 Hz, and velocity V=2500 m/s, the maximum interpolation errors are 28%, 21%, and 7% for the propagation angles $\theta=0°$, 30°, and 60°, respectively. These errors for conventional linear interpolation are much larger than the corresponding ones for the phase-shifted linear interpolation method of the invention, as discussed with relation to Equation (22) above.

For the variable extrapolation step size, inserting the aliasing condition in Equation (14) into Equation (27) yields $$e_l^{\max}(\theta) \approx \frac{\pi^2}{8C^2}\cos^2\theta. \quad (28)$$

With C=1.25, the interpolation errors are 79%, 59%, and 20% for the propagation angles $\theta=0°$, 30°, and 60°, respectively. Again, these errors for conventional linear interpolation are much larger than the corresponding ones for the phase-shifted linear interpolation method of the invention, as discussed with relation to Equation (23) above.

Figure 3:
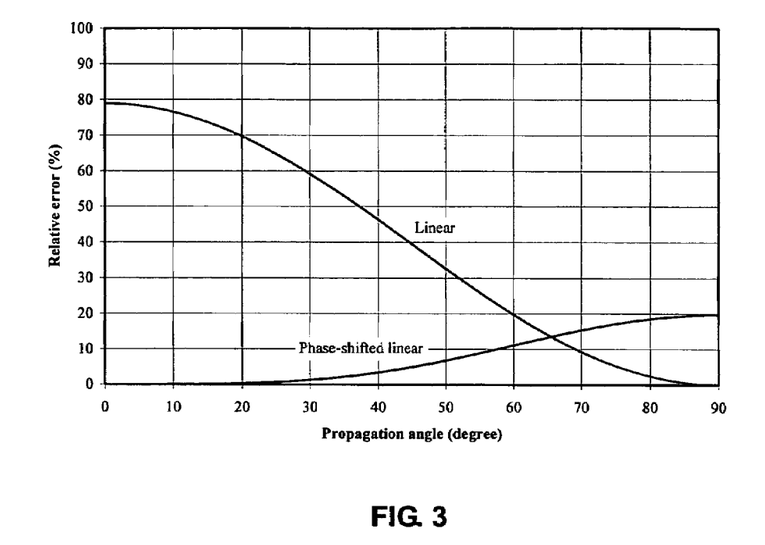
FIG. 3 is a plot of the maximum errors versus the propagation angle for the linear and phase-shifted linear interpolations.

FIG. 3 is a plot of the comparison of the maximum errors versus the propagation angle for both conventional linear interpolation and the phase-shifted linear interpolation of the invention. The errors are calculated for C=1.25, based on Equations (23) and (28). It is noted that for the preferred extrapolation method of the variable step size, the phase-shifted linear interpolation produces a reasonably small error. It is less than 20% for all propagation angles, and is greater than 10% only for the propagation angles greater than 600. The phase-shifted linear interpolation has a smaller error than linear interpolation does for the propagation angles up to 65°. For propagation angles less than 45°, the error for phase-shifted linear interpolation is approximately one order of magnitude smaller than the corresponding error for linear interpolation.

Figure 4:
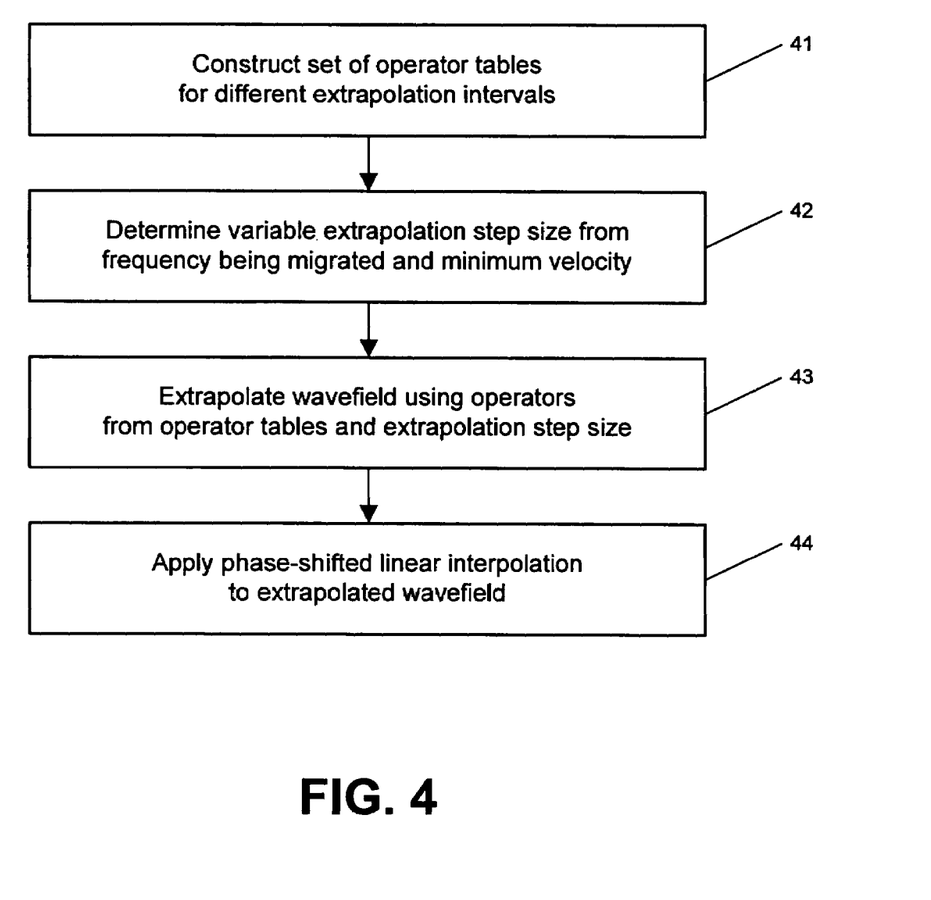
FIG. 4 is a flowchart illustrating the processing steps of an embodiment of the method of the invention for seismic wavefield extrapolation.

FIG. 4 is a flowchart illustrating the processing steps of an embodiment of the method of the invention for seismic wavefield extrapolation in explicit finite difference migration.

In step 41, a sufficient set of operator tables is constructed. Each of the operator tables corresponds to a given extrapolation interval. In one embodiment of the invention, the operator is the constrained operator described in Mittet (2002). In another embodiment of the invention, the operator is designed with dynamically variable operator lengths.

In step 42, the extrapolation step size is determined at a given depth based on the aliasing condition. The step size obtained depends on the maximum wavenumber at the depth. The maximum wavenumber corresponds to the ratio of the frequency being migrated to the minimum velocity at the depth. In one embodiment, the extrapolation step size is determined according to Equation (15). In another embodiment, the extrapolation step size is determined according to Equation (16). In yet another embodiment, the constant C=1.25 in equation (16).

In step 43, wavefield extrapolation is performed utilizing the extrapolation operators from the operator tables from step 41 corresponding to the extrapolation step size determined in step 42.

In step 44, the extrapolated wavefield from step 43 is interpolated onto a regular output depth grid utilizing phase-shifted linear interpolation. In one embodiment, the phase-shifted linear interpolation is determined according to Equation (17).

Figure 5A:
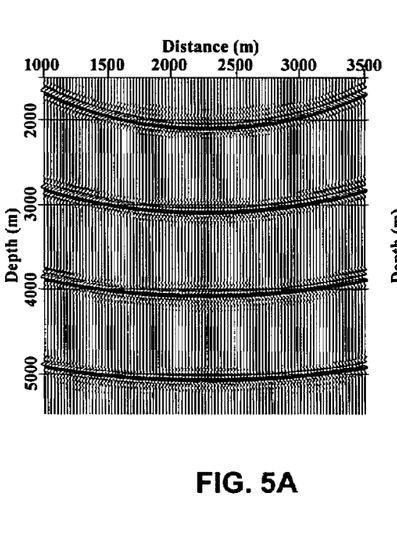
FIG. 5A is a view of wavefields obtained with the constrained operator and phase-shifted linear interpolation.
Figure 5B:
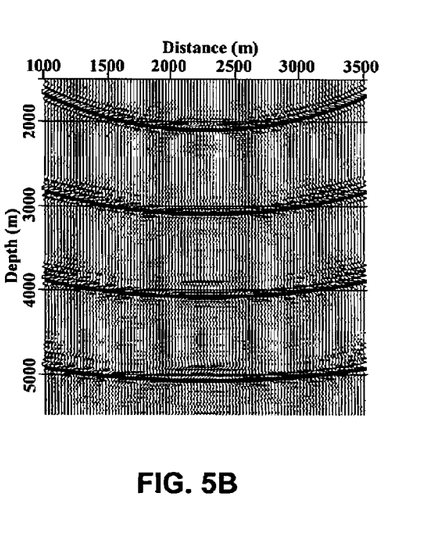
FIG. 5B is a view of wavefields obtained with the constrained operator and conventional linear interpolation.

FIGS. 5A and B shows a comparison of part of the source wavefield snapshot obtained with the phase-shifted and conventional linear interpolations. FIG. 5A is a view of wavefields obtained with the constrained operator and phase-shifted linear interpolation. The wavefield obtained with the phase-shifted linear interpolation is clean and does not have obvious amplitude distortions and phase errors. For comparison, FIG. 5B is a view of the same wavefields obtained with the constrained operator and conventional linear interpolation. The linear interpolation generates strong noise cutting through the wavefronts, obvious amplitude distortions and phase errors can be observed, especially around the low dip portions of the wavefront.

Figure 6A:
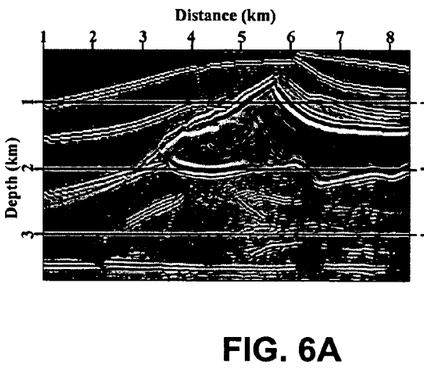
FIG. 6A is a view of model images obtained with the constrained operator, variable extrapolation step size, and phase-shifted linear interpolation.
Figure 6B:
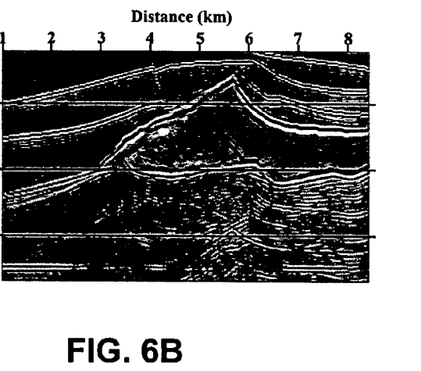
FIG. 6B is a view of the images in FIG. 6A obtained with Kirchhoff depth migration.

To illustrate the method of the invention, the 3D explicit finite-difference wave equation migration is applied to the SEG/EAGE salt model dataset. FIG. 6A is a 2D vertical slice extracted from the 3D migration image cube. FIG. 6A is a view of model images obtained using the constrained operator and extrapolation with a variable step size plus the phase-shifted linear interpolation. The image fits the model in great detail, even for the short-length steps in the reflectors. For comparison, FIG. 6B shows the corresponding images from Kirchhoff depth migration, obtained using energetic raytracing. The image from the wave equation migration has a lower noise level than the image by Kirchhoff migration in the subsalt region. Most importantly, the wave equation migration produces a much more focused and continuous image of the deepest subsalt reflector.

Figure 7A:
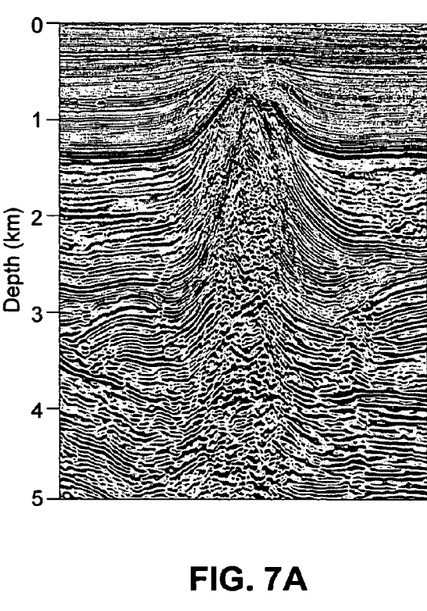
FIG. 7A is a view of real images obtained with the constrained operator, variable extrapolation step size, and phase-shifted linear interpolation.
Figure 7B:
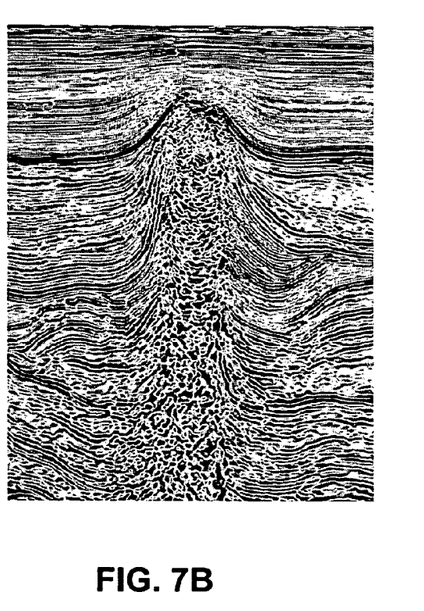
FIG. 7B is a view of the images in FIG. 7A obtained with Kirchhoff depth migration.

The 3D explicit finite-difference wave equation migration is also applied to a real dataset. A portion of the image is shown in FIG. 7A and the corresponding result from Kirchhoff migration is shown in FIG. 7B. FIG. 7A is a view of real images obtained using the constrained operator and extrapolation with a variable step size plus the phase-shifted linear interpolation. FIG. 7B is a view of real images obtained using energetic raytracing. Compared with the image from Kirchhoff migration the wave equation migration gives a more focused and traceable image for the subsalt reflectors.

The constrained operator is accurate and reliable for wavefield extrapolation in explicit finite difference depth migrations. The smaller number of independent coefficients offered by the operator leads to a reduced migration computational cost. Its flexibility to allow for a larger grid interval and shorter operator length in the cross-line direction makes it a useful and efficient method for migrating marine seismic data. The dynamic selection of the operator length and extrapolation step size based on the wavenumber also contribute to the efficiency of the method. The phase-shifted linear interpolation method proposed for interpolating the extrapolated wavefield is suitable for explicit finite difference migration and is more accurate than conventional linear interpolation.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for seismic wavefield extrapolation in 3D explicit finite difference migration, comprising:
   extrapolating a wavefield using variable extrapolation step size; and
   applying phase-shifted linear interpolation to the extrapolated wavefield.

2. The method of claim 1, wherein the wavefield extrapolation utilizes explicit depth extrapolation operators.

3. The method of claim 2, wherein the explicit depth extrapolation operators are constrained finite difference operators.

4. The method of claim 2, wherein the explicit depth extrapolation operators utilize variable operator lengths.

5. The method of claim 1, wherein the variable extrapolation step size is determined by the wavenumber of the wave component being migrated.

6. The method of claim 1, wherein the variable extrapolation step size is determined by the maximum wavenumber at the depth.

7. The method of claim 6, wherein the maximum wavenumber corresponds to the ratio of the frequency being migrated to the minimum velocity at the depth.

8. The method of claim 5, wherein the determination of the extrapolation step size comprises requiring the wavenumber to satisfy the aliasing condition.

9. The method of claim 8, wherein the determination of the extrapolation step size $\Delta z$ is made by applying the formula:

$$\Delta z \leq \frac{1}{2}\frac{V_{min}}{f},$$

where $V_{min}$ is the minimum propagation velocity at an extrapolation depth and f is the frequency being migrated.

10. The method of claim 8, wherein the determination of the extrapolation step size $\Delta z$ is made by applying the formula:

$$\Delta z = \frac{1}{2C}\frac{V_{min}}{f},$$

where $C \geq 1$ is a constant, $V_{min}$ is the minimum propagation velocity at an extrapolation depth, and f is the frequency being migrated.

11. The method of claim 1, wherein the phase-shifted linear interpolation is given by the formula:

$$P(\omega, x, y, z+n\delta z) = \frac{N-n}{N}\exp\left[i\frac{\omega}{V(x,y)}n\delta z\right]P(\omega, x, y, z) +$$

$$\frac{n}{N}\exp\left[-i\frac{\omega}{V(x,y)}(N-n)\delta z\right]P(\omega, x, y, z+\Delta z),$$

where $P(\omega, x, y, z+n\delta z)$ is an interpolated wavefield, $P(\omega, x, y, z)$ is a wavefield at the top of an extrapolation interval, $P(\omega, x, y, z+\Delta z)$ is an extrapolated wavefield at the bottom of the extrapolation interval, $\omega$ is an angular frequency, x and y are lateral coordinates, z is a depth coordinate, $\Delta z$ is the extrapolation steps size, $\delta z$ is an interpolation step size, N is the number of interpolation steps $\delta z$ in the extrapolation step $\Delta z$, n is an interpolation step, and V is a local propagation velocity.

* * * * *